US012100909B2

(12) United States Patent
Ohtaka et al.

(10) Patent No.: US 12,100,909 B2
(45) Date of Patent: Sep. 24, 2024

(54) CONNECTOR

(71) Applicant: Yazaki Corporation, Tokyo (JP)

(72) Inventors: Kazuto Ohtaka, Shizuoka (JP); Daiki Amemiya, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 364 days.

(21) Appl. No.: 17/843,444

(22) Filed: Jun. 17, 2022

(65) Prior Publication Data

US 2022/0320780 A1 Oct. 6, 2022

Related U.S. Application Data

(63) Continuation of application No. PCT/JP2020/046629, filed on Dec. 15, 2020.

(30) Foreign Application Priority Data

Dec. 19, 2019 (JP) ................................ 2019-229046

(51) Int. Cl.

| | |
|---|---|
| ***H01R 13/00*** | (2006.01) |
| ***H01R 13/436*** | (2006.01) |
| ***H01R 13/629*** | (2006.01) |
| ***H01R 13/73*** | (2006.01) |
| ***H01R 43/00*** | (2006.01) |
| ***H01R 43/20*** | (2006.01) |

(52) U.S. Cl.
CPC ....... *H01R 13/4364* (2013.01); *H01R 13/629* (2013.01); *H01R 43/20* (2013.01)

(58) Field of Classification Search
CPC ............ H01R 13/4223; H01R 13/4364; H01R 13/629; H01R 43/20; H01R 43/22
See application file for complete search history.

(56) References Cited

U.S. PATENT DOCUMENTS 6,083,056 A * 7/2000 Okabe .................. H01R 13/506 439/701
6,524,133 B2 * 2/2003 Murakami ......... H01R 13/4364 439/595

(Continued)

FOREIGN PATENT DOCUMENTS

JP 2002-231362 A 8/2002
JP 2012-209223 A 10/2012

*Primary Examiner* — Abdullah A Riyami
*Assistant Examiner* — Thang H Nguyen
(74) *Attorney, Agent, or Firm* — Sughrue Mion, PLLC

(57) ABSTRACT

A connector includes a plurality of terminal receiving chambers arranged in parallel, a plurality of first tool insertion holes, and a plurality of second tool insertion holes. Each terminal receiving chamber is separated from an adjacent terminal receiving chamber by each of side walls disposed on both sides thereof. Each second tool insertion hole is formed to a side wall located at each of ends in a parallel direction of the terminal receiving chambers. In each second tool insertion hole, a lance unlock rib and a tool pressing rib are placed. The lance unlock rib is one of a pair of lance unlock ribs provided to a lance located at each of the ends in the parallel direction of the terminal receiving chambers. The tool pressing rib is provided to a side surface of the each second tool insertion hole, and protrudes in the each second tool insertion hole.

3 Claims, 9 Drawing Sheets

(56) References Cited

U.S. PATENT DOCUMENTS

| | | | | |
|---|---|---|---|---|
| 2002/0102878 | A1* | 8/2002 | Murakami | H01R 13/4364<br>439/595 |
| 2014/0017958 | A1* | 1/2014 | Nemoto | H01R 13/424<br>439/682 |
| 2016/0072218 | A1* | 3/2016 | Chiba | H01R 13/4223<br>439/587 |
| 2018/0034188 | A1* | 2/2018 | Wada | H01R 13/4368 |
| 2020/0006885 | A1* | 1/2020 | Hiei | H01R 13/514 |

* cited by examiner

CONNECTOR

CROSS-REFERENCE TO RELATED APPLICATIONS

The present application is a continuation of International Application No. PCT/JP2020/046629, filed on Dec. 15, 2020, and based upon and claims the benefit of priority from Japanese Patent Application No. 2019-229046, filed on Dec. 19, 2019, the entire contents of which are incorporated herein by reference.

TECHNICAL FIELD

The present application relates to a connector.

BACKGROUND ART

There has been proposed a connector configured to allow a terminal received in a connector housing, to be released by a terminal extracting tool (see Japanese Unexamined Patent Application Publication No. 2002-231362).

A conventional connector includes a connector housing and a terminal. The connector housing includes a plurality of terminal receiving chambers, a plurality of tool insertion holes, and a plurality of lances. Each terminal receiving chamber is separated from an adjacent terminal receiving chamber by each of side walls disposed on both sides thereof. The terminal receiving chambers are arranged in parallel. Each tool insertion hole is formed to each side wall. Each lance is locked to a terminal received in each terminal receiving chamber.

Each lance is provided with a pair of lance unlock ribs protruding in adjacent tool insertion holes. Two lance unlock ribs are placed side by side in each tool insertion hole located at the center side with respect to both ends in a parallel direction of the terminal receiving chambers. One of the two lance unlock ribs is one of a pair of lance unlock ribs provided to one of adjacent lances. The other of the two lance unlock ribs is one of a pair of lance unlock ribs provided to the other of adjacent lances. By placing two lance unlock ribs in one tool insertion hole, the housing connector is made more compact in a with direction thereof.

Next, a terminal release operation will be described. A pair of insertion rod portions of the terminal extracting tool is inserted into adjacent tool insertion holes with respect to a terminal receiving chamber in which a terminal to be released is received. Lifting a pair of lance unlock ribs, which is placed in the adjacent tool insertion holes, with the pair of insertion rod portions, causes the lance to be in a terminal release state. In this state, the terminal to be released is released from the connector housing.

As described above, two lance unlock ribs are placed side by side in each tool insertion hole located at the center side with respect to the both ends in the parallel direction of the terminal receiving chambers. In a process of lifting a pair of lance unlock ribs with a pair of insertion rod portions, this configuration prevents the pair of insertion rod portions from moving in a direction away from the pair of lance unlock ribs (opening direction).

SUMMARY

However, in each of tool insertion holes located at the both ends in the parallel direction of the terminal receiving chambers, only one lance unlock rib is placed. Due to this configuration, in a process of lifting a pair of lance unlock ribs with a pair of insertion rod portions, the pair of insertion rod portions can move in a direction away from the pair of lance unlock ribs. In a case where the pair of insertion rod portions moves in the direction away from the pair of lance unlock ribs, there is a possibility that the pair of insertion rod portions cannot lift the pair of lance unlock ribs.

It is an object of the present application to provide a connector capable of reliably lift a lance unlock rib placed in a tool insertion hole located at each of ends in a parallel direction of a plurality of terminal receiving chambers, with a terminal extracting tool.

According to the present application, there is provided a connector including: a plurality of terminal receiving chambers arranged in parallel, a plurality of first tool insertion holes, a plurality of second tool insertion holes, a plurality of lances, and a plurality of pairs of lance unlock ribs. Each terminal receiving chamber is separated from an adjacent terminal receiving chamber by each of side walls disposed on both sides thereof. Each first tool insertion hole is formed to each of side walls excluding side walls located at ends in a parallel direction of the plurality of terminal receiving chambers. Each second tool insertion hole is formed to a side wall located at each of the ends in the parallel direction of the plurality of terminal receiving chambers. Each lance is to be locked to a terminal received in each terminal receiving chamber, and capable of moving toward a terminal unlocking direction by elastic deformation thereof. Each pair of lance unlock ribs is provided to each lance, and protrudes in the first tool insertion holes adjacent to each other or in the first tool insertion hole and the second tool insertion hole adjacent to each other. Two lance unlock ribs are placed side by side in each first tool insertion hole. One of the two lance unlock ribs is one of a pair of lance unlock ribs provided to one of adjacent lances. The other of the two lance unlock ribs is one of a pair of lance unlock ribs provided the other of adjacent lances. A lance unlock rib and a tool pressing rib are placed side by side in each second tool insertion hole. The lance unlock rib is one of a pair of lance unlock ribs provided to a lance located at each of the ends in the parallel direction of the plurality of terminal receiving chambers. The tool pressing rib is provided to a side surface of the each second tool insertion hole, and protrudes in the each second tool insertion hole. A terminal extracting tool is capable of being inserted in the first tool insertion holes adjacent to each other or in the first tool insertion hole and the second tool insertion hole adjacent to each other.

The tool pressing rib may be mounted along an insertion direction of the terminal extracting tool in the each second tool insertion hole.

The tool pressing rib may be mounted at a position where the tool pressing rib faces the lance unlock rib in the each second tool insertion hole.

According to the present application, there can be provided a connector capable of reliably lift a lance unlock rib placed in a tool insertion hole located at each of ends in a parallel direction of a plurality of terminal receiving chambers, with a tool extracting tool.

DESCRIPTION OF EMBODIMENTS

Figure 1A:
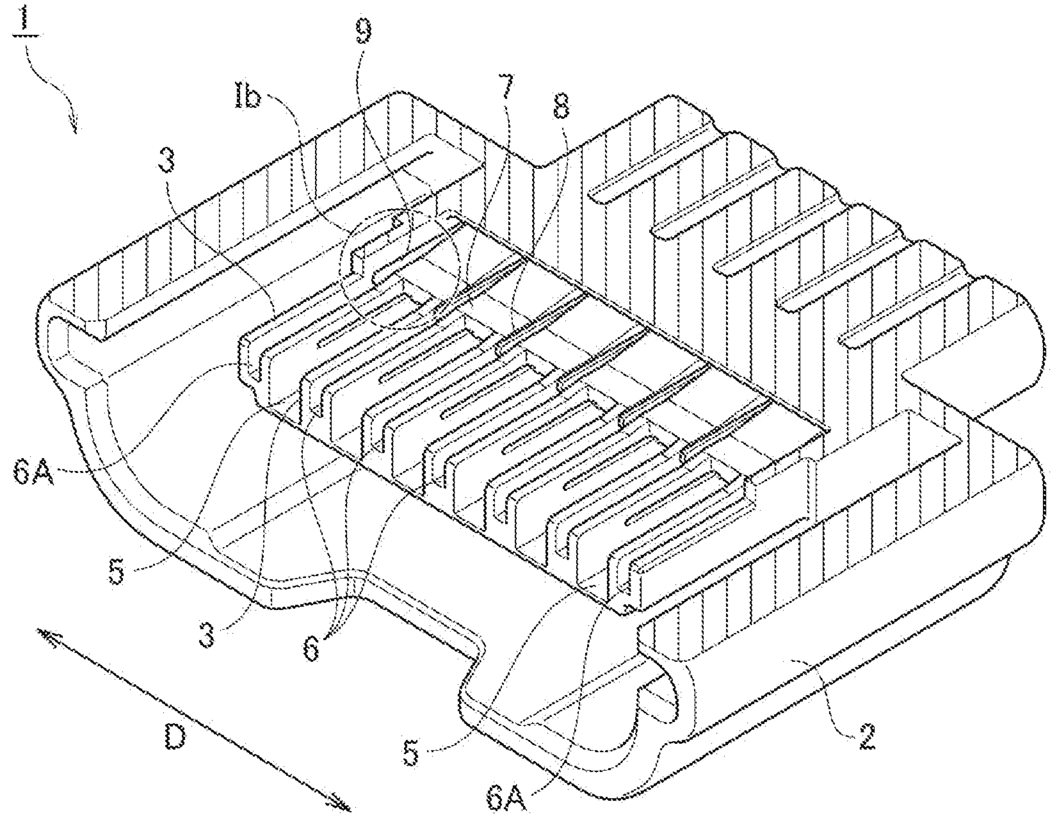
FIG. 1A is a perspective view illustrating a cross-sectional surface of a connector according to an embodiment.
Figure 1B:
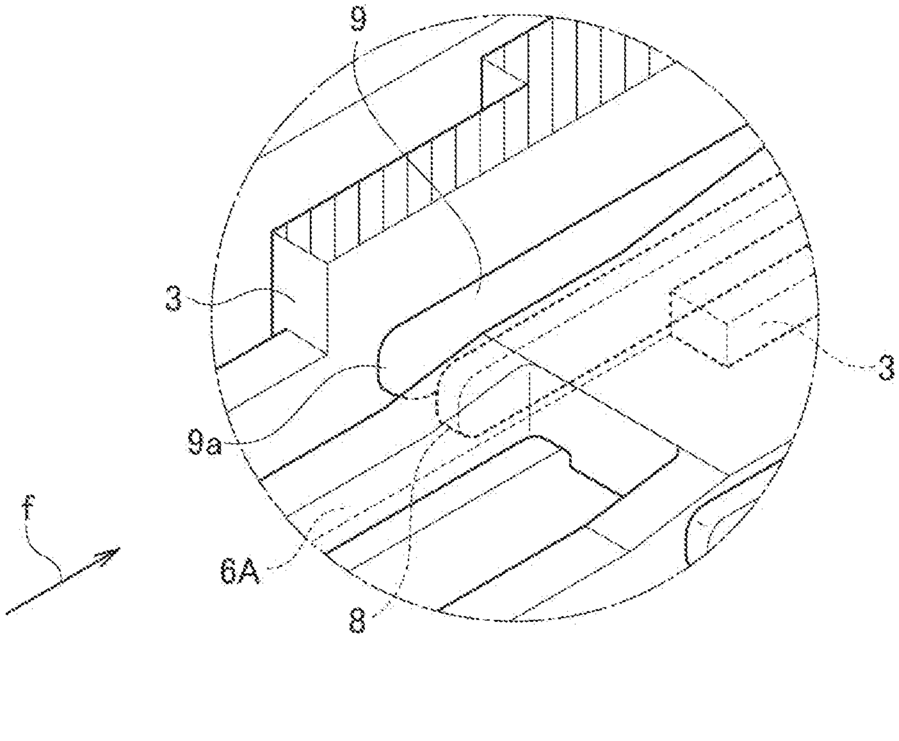
FIG. 1B is an enlarged view of a section Ib in FIG. 1A (in which a lance unlock rib is illustrated with a virtual line).
Figure 2:
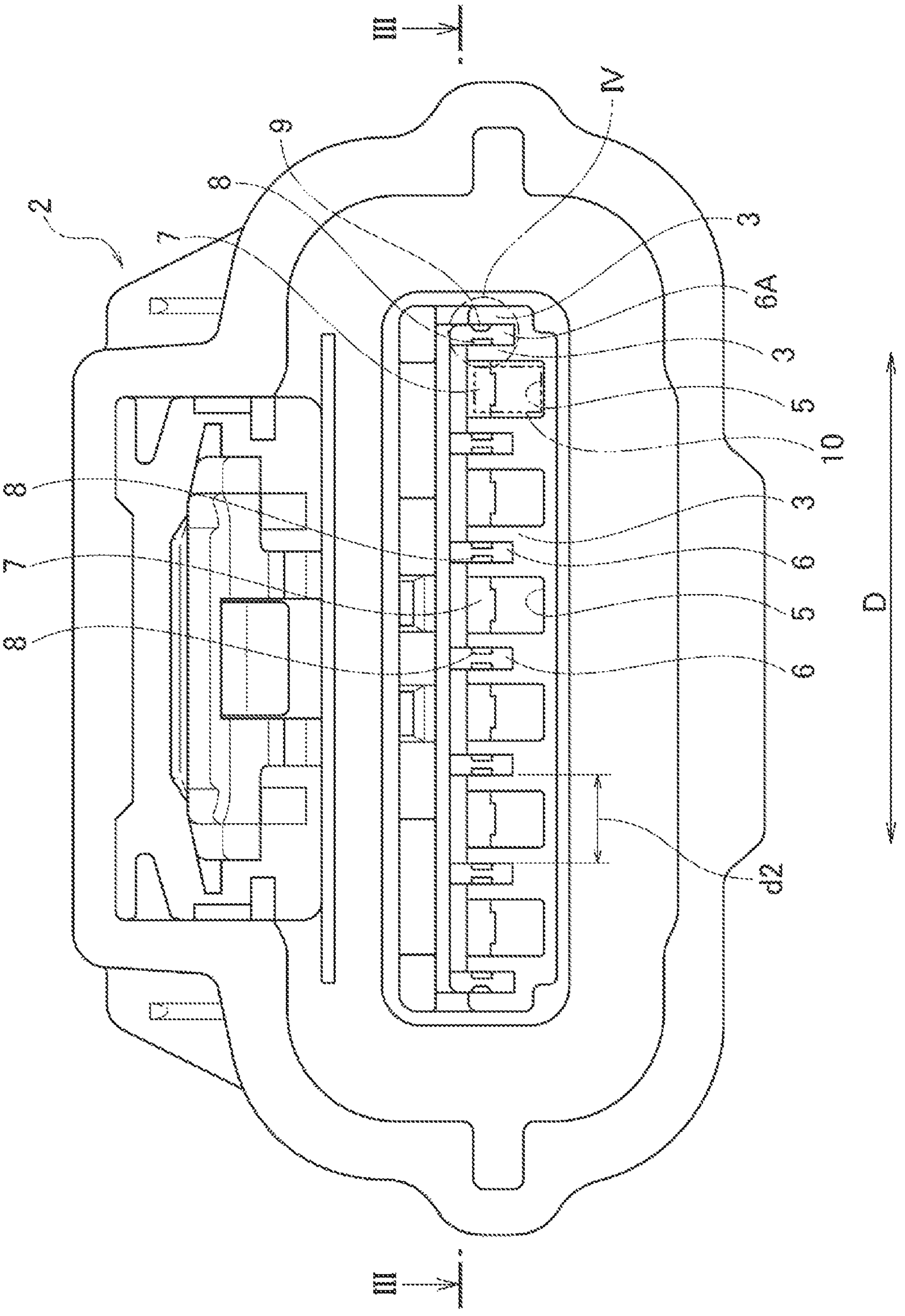
FIG. 2 is a front view of the connector according to the embodiment.
Figure 3:
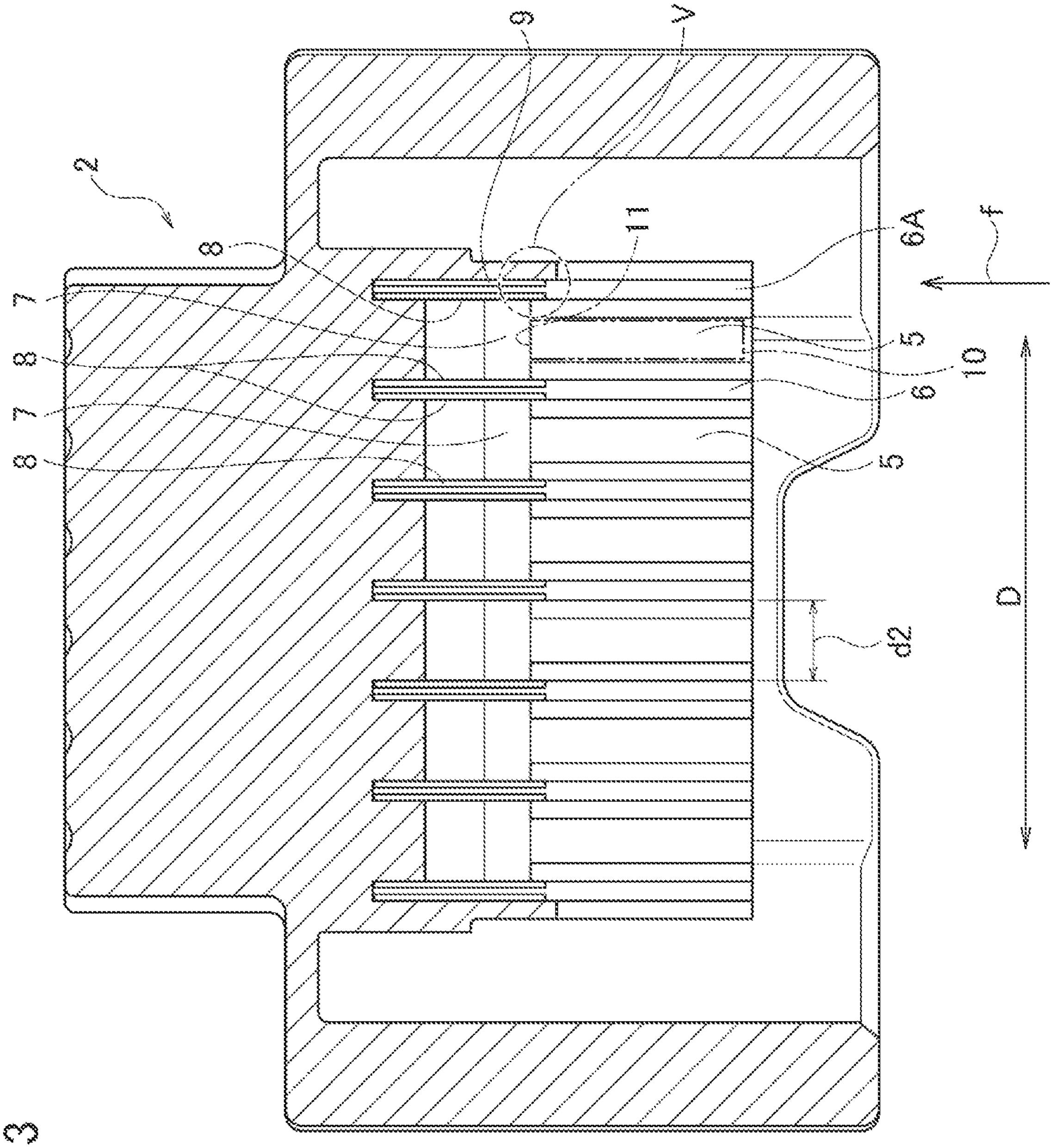
FIG. 3 is a cross-sectional view taken along a line III-III of FIG. 2.
Figure 4:
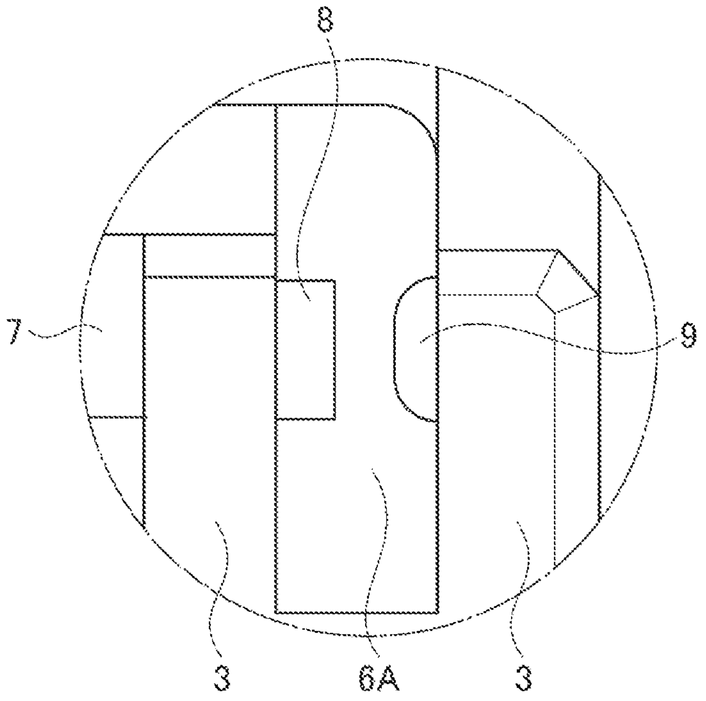
FIG. 4 is an enlarged view of a section IV in FIG. 2.

With reference to the drawings, a connector according to this embodiment will be described below in detail.

As illustrated in FIG. 1A to FIG. 5, a connector 1 according to this embodiment includes a connector housing 2 and a plurality of terminals 10 received in the connector housing 2. For convenience of explanation, a direction in which a plurality of terminal receiving chambers 5 to be described later is arranged in parallel, is called a parallel direction D of the plurality of terminal receiving chambers 5 (see FIG. 1A, FIG. 2 and FIG. 3). The parallel direction D of the plurality of terminal receiving chambers 5 is also called a width direction of the connector 1.

The connector housing 2 includes a plurality of terminal receiving chambers 5, a plurality of first tool insertion holes 6, two second tool insertion holes 6A, and a plurality of lances 7. Each terminal receiving chamber 5 is separated from an adjacent terminal receiving chamber 5 by each of side walls 3, 3 disposed on both sides thereof. Each first tool insertion hole 6 is formed to each of side walls 3, excluding the side walls 3, 3 located on the both ends in the parallel direction D of the plurality of terminal receiving chambers 5. Each second tool insertion hole 6A is formed to each of the side walls 3, 3 located on the both ends in the parallel direction D of the plurality of terminal receiving chambers 5. Each lance 7 is locked to a terminal 10 received in each terminal receiving chamber 5.

The terminal receiving cambers 5 are arranged in parallel at regular intervals, along the width direction (parallel direction D) of the connector 1. In each terminal receiving chamber 5, both ends of the terminal receiving chamber 5 in a longitudinal direction thereof are opened to the outside. Each of mating terminals (not illustrated) of a mating connector is inserted from one end of each terminal receiving chamber 5 in the longitudinal direction thereof and is fitted with the terminal receiving chamber 5. Each of the terminals 10 is inserted from the other end of each terminal receiving chamber 5 in the longitudinal direction thereof and is received in the terminal receiving chamber 5.

In each first tool insertion hole 6, one end of the first tool insertion hole 6 in a longitudinal direction thereof is opened to the outside. A terminal extracting tool 20 to be described later can be inserted from the one end of the first tool insertion hole 6 in the longitudinal direction thereof. As well, in each second tool insertion hole 6A, one end of the second tool insertion hole 6A in a longitudinal direction thereof is opened to the outside. The terminal extracting tool 20 can be inserted from the one end of the second tool insertion hole 6A in the longitudinal direction thereof.

Each lance 7 enters in a locking hole 11 of each terminal 10 (illustrated in FIG. 3, FIG. 7A, FIG. 8A and FIG. 9A) and locks the terminal 10. Each lance 7 is provided such that the lance 7 can move toward a terminal unlocking direction in which the lance 7 is released from the locking hole 11 by elastic deformation thereof. A pair of lance unlock ribs 8, 8 is provided on both sides of each lance 7 in the parallel direction D of the plurality of terminal receiving chambers 5. The lance unlock ribs 8, 8 protrude in the first tool insertion holes 6, 6 adjacent to each other or in the first tool insertion hole 6 and the second tool insertion hole 6A adjacent to each other, respectively.

In each first tool insertion hole 6, two lance unlock ribs 8, 8 are placed side by side. One of the two lance unlock ribs 8, 8 is one of a pair of lance unlock ribs 8, 8 provided to one of adjacent lances 7, 7. The other of the two lance unlock ribs 8, 8 is one of a pair of lance unlock ribs 8, 8 provided to the other of adjacent lances 7, 7.

In each second tool insertion hole 6A, one lance unlock rib 8 and one tool pressing rib 9 are placed side by side. The one lance unlock rib 8 is one of a pair of lance unlock ribs 8, 8 provided to a lance 7 located at one end in the parallel direction D of the plurality of terminal receiving chambers 5. The one tool pressing rib 9 is mounted on a side surface of the second tool insertion hole 6A and protrudes in the second tool insertion hole 6A.

The tool pressing rib 9 is mounted along an insertion direction f of the terminal extracting tool 20 in the second tool insertion hole 6A.

Figure 5:
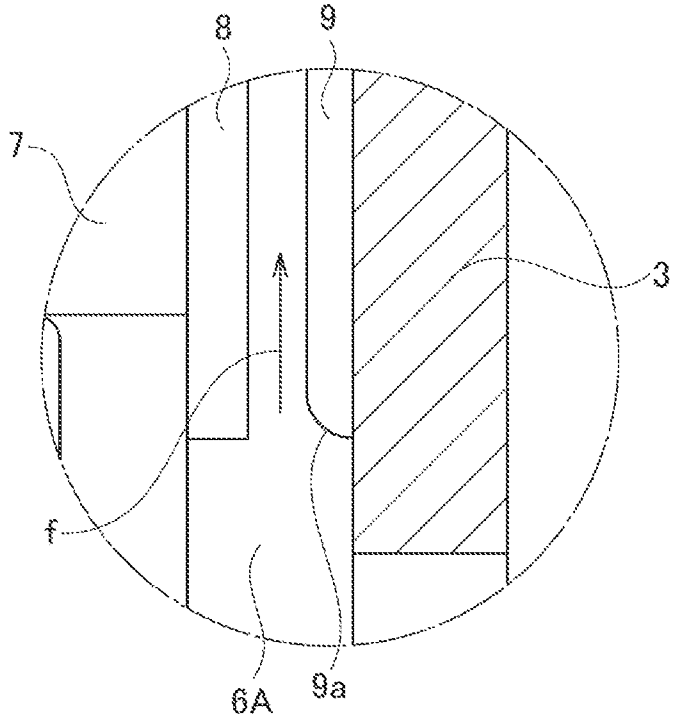
FIG. 5 is an enlarged view of a section V in FIG. 3.
Figure 6A:
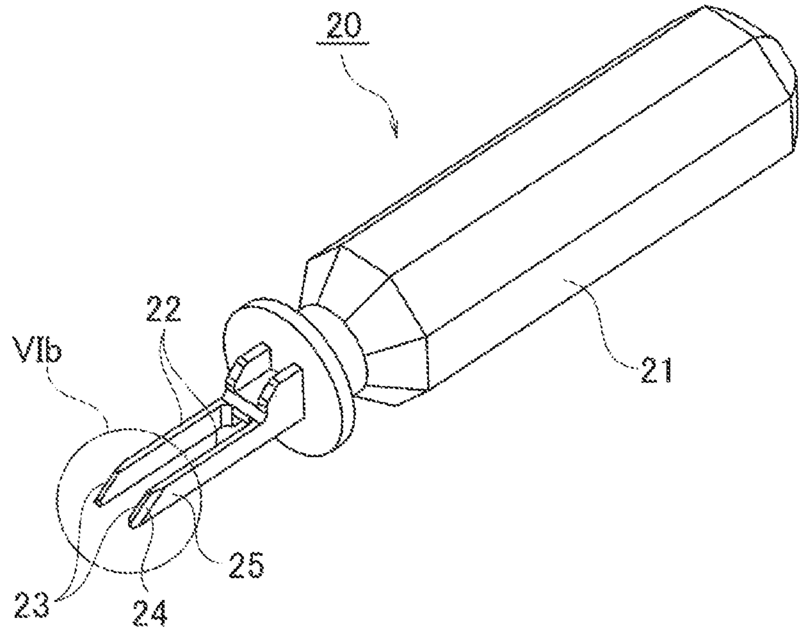
FIG. 6A is a perspective view of a terminal extracting tool according to the embodiment.
Figure 6B:
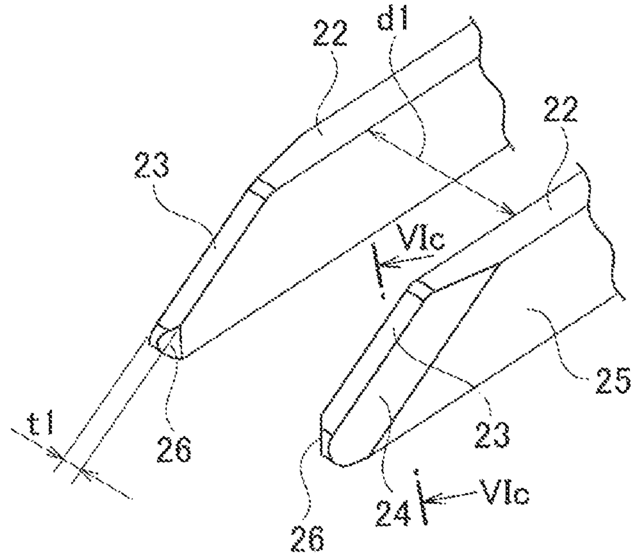
FIG. 6B is an enlarged view of a section VIb in FIG. 6A.
Figure 6C:
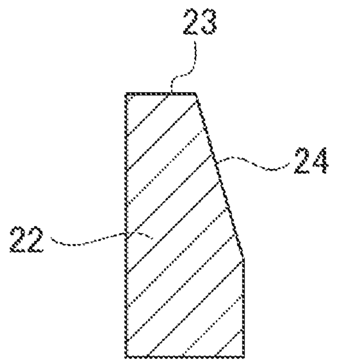
FIG. 6C is a cross-sectional view taken along a line VIc-VIc of FIG. 6B.
Figure 6D:
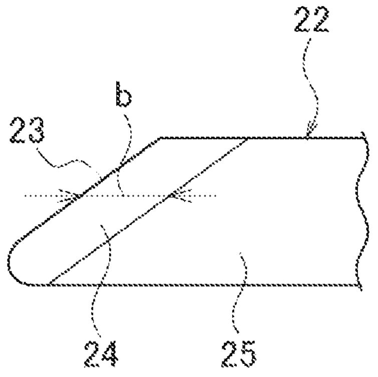
FIG. 6D is a side view of an end part of an insertion rod portion according to the embodiment.

In each second tool insertion hole 6A, the tool pressing rib 9 faces the lance unlock rib 8. More specifically, in each second tool insertion hole 6A, a side surface of the tool pressing rib 9 faces a side surface of the lance unlock rib 8. As illustrated in FIG. 5, a tool pressing round surface 9*a* is formed on an end part of the tool pressing rib 9. The tool pressing round surface 9*a* is formed in a direction to guide an end of one of a pair of insertion rod portions 22, 22 of the terminal extracting tool 20 toward a side of the lance unlock rib 8.

As illustrated in FIG. 6A to FIG. 6D, the terminal extracting tool 20 includes a holding portion 21 and the pair of insertion rod portions 22, 22. The insertion rod portions 22, 22 are supported by the holding portion 21. Thus, an end region of the terminal extracting tool 20 is branched at a part where the insertion rod portions 22, 22 are supported by the holding portion 21 (a root of the insertion rod portions 22, 22). In the connector housing 2, an interval d1 between the insertion rod portions 22, 22 is set based on an interval d2 between the first tool insertion holes 6, 6 adjacent to each other or between the first tool insertion hole 6 and the second tool insertion hole 6A adjacent to each other (see FIG. 2 and FIG. 3). In the present embodiment, the interval d1 is equal to the interval d2.

In an end part of each insertion rod portion 22, a lance lifting surface 23 and an adjacent lance releasing surface 24 are formed. The lance lifting surface 23 is formed in a tapered shape such that the lance lifting surface 23 is lowest at a leading edge thereof and gradually becomes higher toward the root of the insertion rod portion 22. The leading edge of the lance lifting surface 23 is formed at a position where the insertion rod portion 22 enters below the lance unlock rib 8 in a process of inserting the insertion rod portion 22 in the first tool insertion hole 6 or the second tool insertion hole 6A.

The adjacent lance releasing surface 24 is formed on a side surface of the insertion rod portion 22, which is located at a side of the lance unlock rib 8 or the tool pressing rib 9 adjacent to the lance unlock rib 8 to be lifted by the insertion rod portion 22 in the process of inserting the insertion rod portion 22 in the first tool insertion hole 6 or the second tool insertion hole 6A. The lance unlock rib 8 to be lifted by the insertion rod portion 22, is called the lance unlock rib 8 to be unlocked.

The adjacent lance releasing surface 24 is formed in a tapered shape such that the adjacent lance releasing surface 24 makes a width dimension t1 of the lance lifting surface 23 narrowest, and slopes gradually outward from an outer edge of the lance lifting surface 23 toward a root direction of the insertion rod portion 22 to widen the width dimension. The adjacent lance releasing surface 24 is formed to have a constant width dimension b from the lance lifting surface 23 along the root direction of the insertion rod portion 22. Namely, the adjacent lance releasing surface 24 is formed in the tapered shape, and gradually separates from the lance unlock rib 8 to be unlocked, the lance unlock rib 8 or the tool pressing rib 9 adjacent to the lance unlock rib 8 to be unlocked, in the process of inserting the insertion rod portion 22 in the first tool insertion hole 6 or the second tool insertion hole 6A.

A tool opening prevention surface 25 is provided on a side surface continuous from the adjacent lance releasing surface 24 to a root side of the insertion rod portion 22. The tool opening prevention surface 25 extends in the insertion direction f of the insertion rod portion 22.

An insertion hole pick-up surface 26 is provided at a leading edge region of each insertion rod portion 22. The insertion hole pick-up surface 26 is formed in a tapered shape and provided on a side surface opposite to the side surface on which the adjacent lance releasing surface 24 is provided. In a case where the leading edge region of the insertion hole portion 22 is shifted from an opening position of the first tool insertion hole 6 or the second tool insertion hole 6A, the insertion hole pick-up surface 26 guides the leading edge region of the insertion rode portion 22 in the first tool insertion hole 6 or the second tool insertion hole 6A.

Next, a release operation of the terminal 10 will be described. First, in a situation where the terminal 10 to be released from the connector housing 2 is received in each terminal receiving chamber 5 excluding the terminal receiving chambers 5, 5 located on the both ends in the parallel direction D of the plurality of terminal receiving chambers 5, the release operation of the terminal 10 will be described.

The insertion rod portions 22, 22 of the terminal extracting tool 20 are inserted in the first tool insertion holes 6, 6 adjacent to the terminal receiving chamber 5 in which the terminal 10 to be released is received, respectively. As insertion of the insertion rod portions 22, 22 proceeds, the lance lifting surfaces 23, 23 of the insertion rod portions 22, 22 enter below the lance unlock ribs 8, 8 to be unlocked which are provided on the both sides of the lance 7 that is locked to the terminal 10 to be released. As the insertion of the insertion rod portions 22, 22 further proceeds, the lance lifting surfaces 23, 23 of the insertion rod portions 22, 22 gradually lift the lance unlock ribs 8, 8 to be unlocked.

As insertion of the insertion rod portions 22, 22 proceeds, the adjacent lance releasing surfaces 24, 24 of the insertion rod portions 22, 22 move the lance unlock ribs 8, 8 adjacent to the lance unlock ribs 8, 8 to be unlocked, in a direction away from the lance unlock ribs 8,8 to be unlocked. Thereby, the lance unlock ribs 8, 8 adjacent to the lance unlock ribs 8, 8 to be unlocked, are prevented from being lifted together with the lance unlock ribs 8, 8 to be unlocked by the insertion rod portions 22, 22.

Even if the insertion rod portions 22, 22 are inserted in the first tool insertion holes 6, 6 in a situation where the insertion rod portions 22, 22 are opened from a normal position (in a situation where they are opened toward a side of the lance unlock ribs 8, 8 adjacent to the lance unlock ribs 8, 8 to be unlocked), the adjacent lance releasing surfaces 24, 24 can return the insertion rod portions 22, 22 to the normal position by a reaction force from the lance unlock ribs 8, 8 adjacent to the lance unlock ribs 8, 8 to be unlocked.

In a process of inserting the insertion rod portions 22, 22 in the first tool insertion holes 6, 6, the tool opening prevention surfaces 25, 25 of the insertion rod portions 22, 22 contact the lance unlock ribs 8, 8 adjacent to the lance unlock ribs 8, 8 to be unlocked, next to the adjacent lance releasing surfaces 24, 24. Thereby, the end parts of the insertion rod portions 22, 22 are prevented from moving in the direction away from the lance unlock ribs 8,8 to be unlocked. Therefore, the insertion rod portions 22, 22 can keep a state where the lance unlock ribs 8, 8 to be unlocked are lifted to a lance unlock position.

With this configuration, the insertion rod portions 22, 22 displaces the lance 7 to a terminal release position by lifting only the lance unlock ribs 8, 8 to be unlocked while gradually pressing upward only the lance unlock ribs 8, 8 to be unlocked. In this state, the terminal 10 to be released can be extracted from the connector housing 2.

Next, in a situation where the terminal 10 to be released from the connector housing 2 is received in the terminal receiving chamber 5 located on the end in the parallel direction D of the plurality of terminal receiving chambers 5, the release operation of the terminal 10 will be described. In this case, the insertion rod portions 22, 22 of the terminal extracting tool 20 are inserted in the second tool insertion hole 6A located on the end in the parallel direction D of the plurality of terminal receiving chambers 5 and the first tool insertion hole 6 adjacent to the second tool insertion hole 6A, respectively.

By the above-described operation, the insertion rod portion 22 inserted in the first tool insertion hole 6 adjacent to the second tool insertion hole 6A, lifts the lance unlock rib 8 to be unlocked.

Figure 7A:
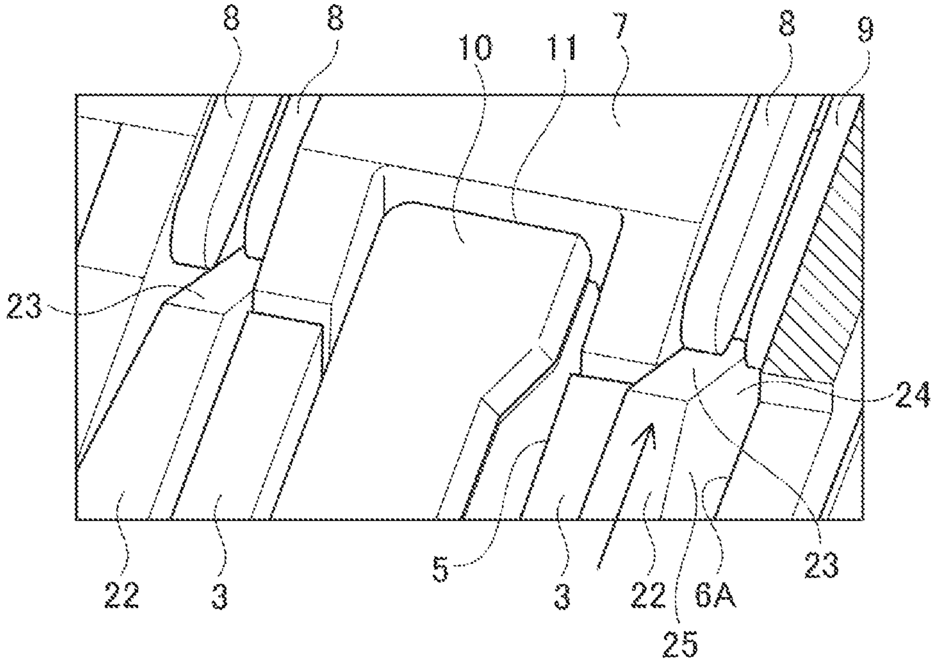
FIG. 7A is a perspective view illustrating an unlocking initial state of a lance unlock rib placed in a second tool insertion hole located at an end in a parallel direction of a plurality of terminal receiving chambers.
Figure 7B:
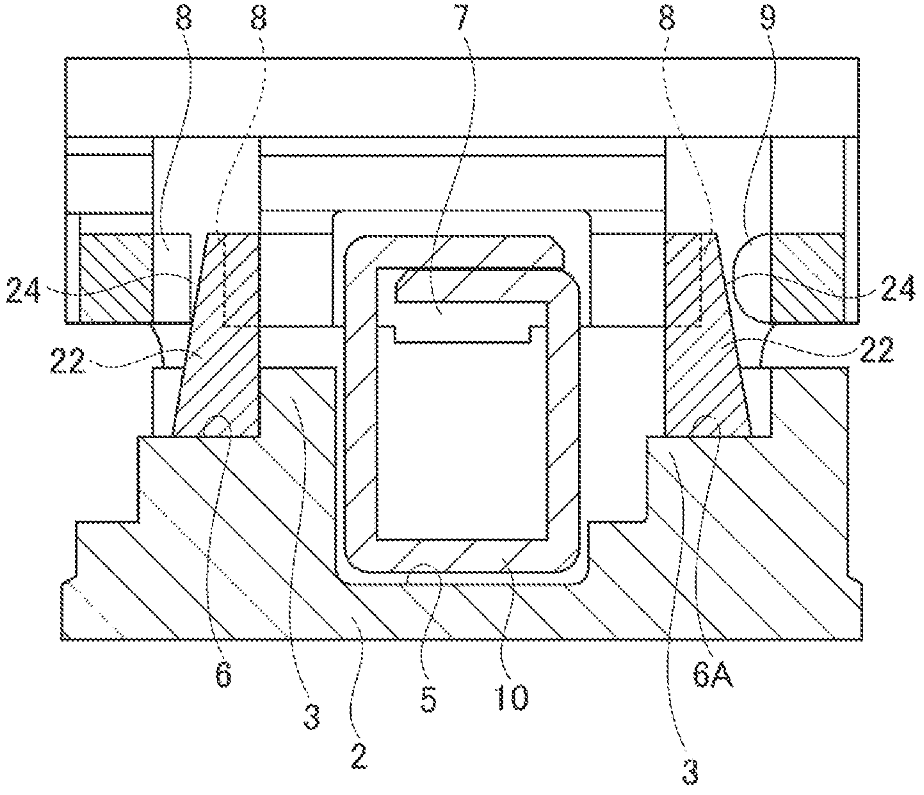
FIG. 7B is a cross-sectional view illustrating the unlocking initial state of the lance unlock rib placed in the second tool insertion hole located at the end in the parallel direction of the plurality of terminal receiving chambers.
Figure 8A:
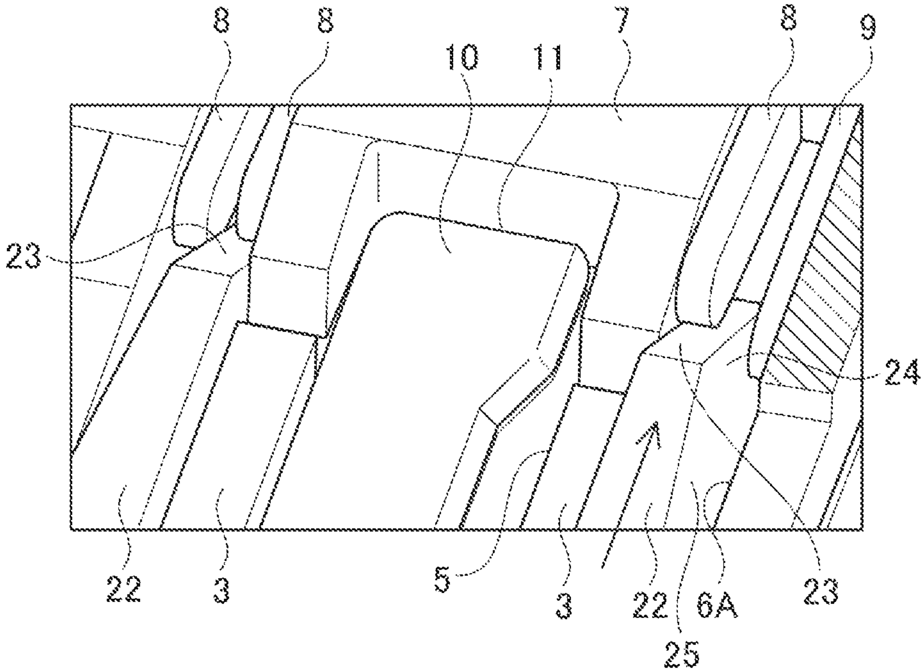
FIG. 8A is a perspective view illustrating an unlocking middle state of the lance unlock rib placed in the second tool insertion hole located at the end in the parallel direction of the plurality of terminal receiving chambers.
Figure 8B:
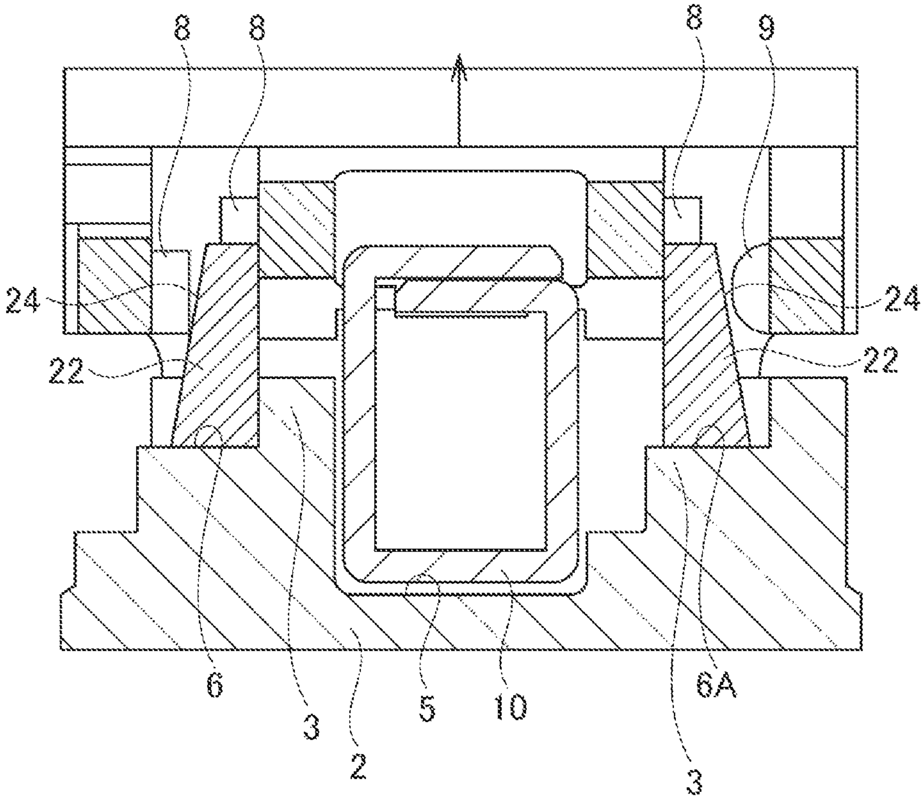
FIG. 8B is a cross-sectional view illustrating the unlocking middle state of the lance unlock rib placed in the second tool insertion hole located at the end in the parallel direction of the plurality of terminal receiving chambers.

When the insertion rod portion 22 is inserted in the second tool insertion hole 6A, the lance lifting surfaces 23 of the insertion rod portion 22 firstly enters below the lance unlock rib 8 to be unlocked which is provided on one side of the lance 7 that is locked to the terminal 10 to be released, as illustrated in FIG. 7A and FIG. 7B. As illustrated in FIG. 8A and FIG. 8B, as the insertion of the insertion rod portion 22 proceeds, the lance lifting surface 23 of the insertion rod portion 22 gradually lifts the lance unlock rib 8 to be unlocked.

If the insertion rod portion 22 is inserted in the second tool insertion hole 6A in a situation where the insertion rod portion 22 is opened from a normal position (in a situation where it is opened toward a side of the tool pressing rib 9 adjacent to the lance unlock rib 8 to be unlocked), the adjacent lance releasing surface 24 contacts the tool pressing rib 9 adjacent to the lance unlock rib 8 to be unlocked, and receives a reaction force from the tool pressing rib 9. Thereby, the insertion rod portion 22 is returned to the normal position, which reliably lifts the lance unlock rib 8 to be unlocked.

Figure 9A:
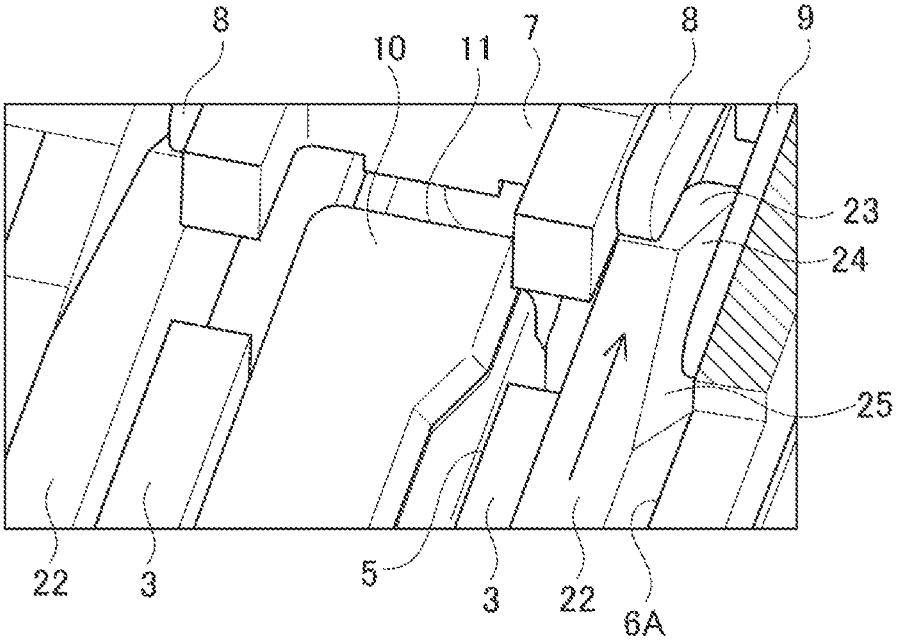
FIG. 9A is a perspective view illustrating an unlocking complete state of the lance unlock rib placed in the second tool insertion hole located at the end in the parallel direction of the plurality of terminal receiving chambers.
Figure 9B:
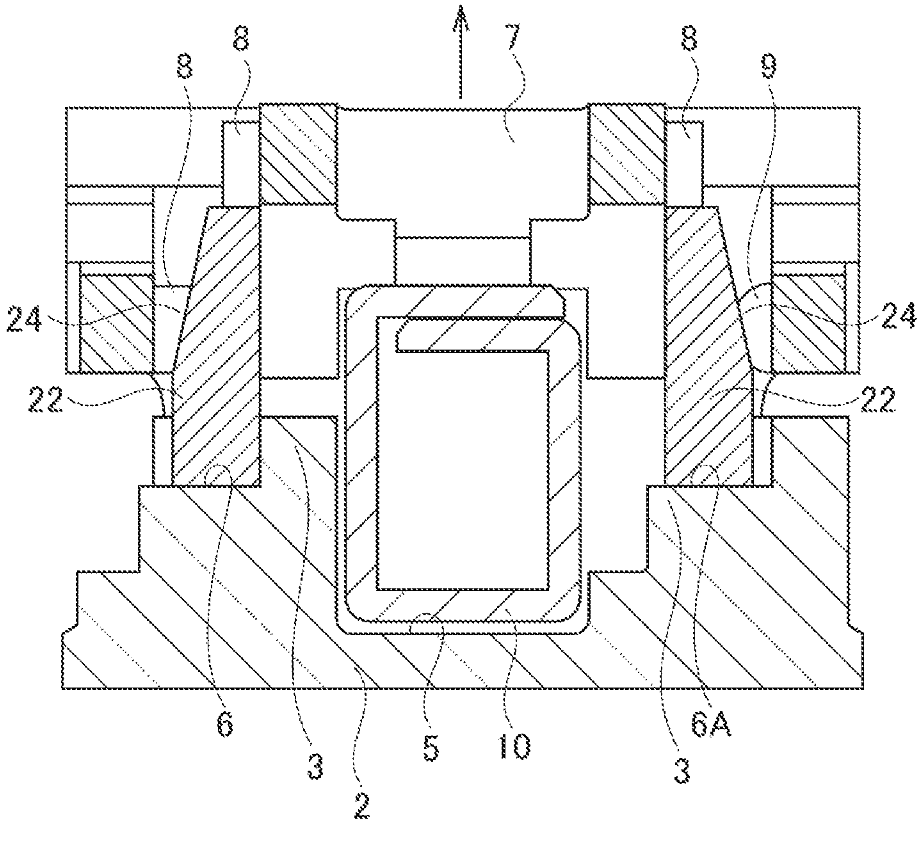
FIG. 9B is a cross-sectional view illustrating the unlocking complete state of the lance unlock rib placed in the second tool insertion hole located at the end in the parallel direction of the plurality of terminal receiving chambers.

After contacting the adjacent lance releasing surface 24 of the insertion rod portion 22, the tool pressing rib 9 contacts the tool opening prevention surface 25 of the insertion rod portion 22. Thereby, the end part of the insertion rod portion 22 is prevented from moving in a direction away from the lance unlock rib 8 to be unlocked. Therefore, as illustrated in FIG. 9A and FIG. 9B, the insertion rod portion 22 can keep a state where the lance unlock rib 8 to be unlocked is lifted to the lance unlock position.

With this configuration, the insertion rod portions 22, 22 displace the lance 7 to the terminal release position by lifting only the lance unlock ribs 8, 8 to be unlocked while gradually pressing upward only the lance unlock ribs 8, 8 to be unlocked. In this state, the terminal 10 to be released can be extracted from the connector housing 2.

Thus, a connector 1 includes the plurality of terminal receiving chambers 5 arranged in parallel, the plurality of first tool insertion holes 6, the plurality of second tool insertion holes 6A, the plurality of lances 7, and the plurality of pairs of lance unlock ribs 8, 8. Each terminal receiving chamber 5 is separated from the adjacent terminal receiving chamber 5 by each of the side walls 3, 3 disposed on the both sides thereof. Each first tool insertion hole 6 is formed to each of side walls 3 excluding the side walls 3 located at ends in the parallel direction of the plurality of terminal receiving chambers 5. Each second tool insertion hole 6A is formed to the side wall 3 located at each of the ends in the parallel direction of the plurality of terminal receiving chambers 5. Each lance 7 is to be locked to the terminal received in each terminal receiving chamber 5, and capable of moving toward the terminal unlocking direction by elastic deformation thereof. Each pair of lance unlock ribs 8, 8 is provided to each lance 7, and protrudes in the first tool insertion holes 6, 6 adjacent to each other or in the first tool insertion hole 6 and the second tool insertion hole 6A adjacent to each other, Two lance unlock ribs 8, 8 are placed side by side in each first tool insertion hole 6. One of the two lance unlock ribs 8, 8 is one of a pair of lance unlock ribs 8, 8 provided to one of adjacent lances 7, 7. The other of the two lance unlock ribs 8, 8 is one of a pair of lance unlock ribs 8, 8 provided the other of adjacent lances 7, 7. The lance unlock rib 8 and the tool pressing rib 9 are placed side by side in each second tool insertion hole 6A. The lance unlock rib 8 is one of a pair of lance unlock ribs 8, 8 provided to a lance 7 located at each of the ends in the parallel direction of the plurality of terminal receiving chambers 5. The tool pressing rib 9 is provided to a side surface of the each second tool insertion hole 6A, and protrudes in the each second tool insertion hole 6A. The terminal extracting tool 20 is capable of being inserted in the first tool insertion holes 6, 6 adjacent to each other or in the first tool insertion hole 6 and the second tool insertion hole 6A adjacent to each other.

Therefore, even if the end part of the insertion rod portion 22 is inserted in the second tool insertion hole 6A located at each of the ends in the parallel direction D of the plurality of terminal receiving chambers 5, the end part of the insertion rod portion 22 is prevented from moving toward a direction away from the lance unlock rib 8 to be unlocked, by the tool pressing rib 9. This configuration can reliably unlock the lance unlock rib 8 to be unlocked which is placed in the second tool insertion hole 6A located at each of the ends in the parallel direction D of the plurality of terminal receiving chambers 5.

The tool pressing rib 9 is mounted along the insertion direction f of the terminal extracting tool 20 in the second tool insertion hole 6A. Therefore, an internal configuration in the second tool insertion hole 6A located at each of the ends in the parallel direction D of the plurality of terminal receiving chambers 5 is nearly the same as an internal configuration in the first tool insertion hole 6 not located at each of the ends in the parallel direction D of the plurality of terminal receiving chambers 5.

The tool pressing rib 9 is mounted at a position where the tool pressing rib 9 faces the lance unlock rib 8 to be unlocked in the second tool insertion hole 6A. Therefore, the tool pressing rib 9 reliably interferes in the adjacent lance releasing surface 24 of the insertion rod portion 22.

Although the present embodiment is described above, it is not limited thereto, and may be modified within the gist of this embodiment.

The entire contents of Japanese patent application No. 2019-229046 (filed on Dec. 19, 2019) are herein invoked.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connector comprising:

a plurality of terminal receiving chambers arranged in parallel, each terminal receiving chamber being separated from an adjacent terminal receiving chamber by each of side walls disposed on both sides thereof;

a plurality of first tool insertion holes, each first tool insertion hole being formed to each of side walls excluding side walls located at ends in a parallel direction of the plurality of terminal receiving chambers;

a plurality of second tool insertion holes, each second tool insertion hole being formed to a side wall located at each of the ends in the parallel direction of the plurality of terminal receiving chambers;

a plurality of lances, each lance being to be locked to a terminal received in each terminal receiving chamber, and capable of moving toward a terminal unlocking direction by elastic deformation thereof; and a plurality of pairs of lance unlock ribs, each pair of lance unlock ribs being provided to each lance, and protruding in the first tool insertion holes adjacent to each other or in the first tool insertion hole and the second tool insertion hole adjacent to each other, wherein two lance unlock ribs are placed side by side in each first tool insertion hole, one of the two lance unlock ribs being one of a pair of lance unlock ribs provided to one of adjacent lances, and the other of the two lance unlock ribs being one of a pair of lance unlock ribs provided the other of adjacent lances, a lance unlock rib and a tool pressing rib are placed side by side in each second tool insertion hole, the lance unlock rib being one of a pair of lance unlock ribs provided to a lance located at each of the ends in the parallel direction of the plurality of terminal receiving chambers, and the tool pressing rib being provided to a side surface of the each second tool insertion hole, and protruding in the each second tool insertion hole, and a terminal extracting tool is capable of being inserted in the first tool insertion holes adjacent to each other or in the first tool insertion hole and the second tool insertion hole adjacent to each other.

2. The connector according to claim 1, wherein the tool pressing rib is mounted along an insertion direction of the terminal extracting tool in the each second tool insertion hole.

3. The connector according to claim 1, wherein the tool pressing rib is mounted at a position where the tool pressing rib faces the lance unlock rib in the each second tool insertion hole.

* * * * *